United States Patent [19]

Welledits et al.

[11] Patent Number: 4,994,392
[45] Date of Patent: Feb. 19, 1991

[54] DEVICE FOR HEATING BREWING MASH

[75] Inventors: Walter Welledits; Albert Welledits, both of Vienna, Austria

[73] Assignee: O. Salm & Co. GmbH, Vienna, Austria

[21] Appl. No.: 269,441

[22] Filed: Nov. 10, 1988

[30] Foreign Application Priority Data

Nov. 10, 1987 [DE] Fed. Rep. of Germany ....... 3738185

[51] Int. Cl.$^5$ .............................................. C12M 1/38
[52] U.S. Cl. .................... 435/790; 435/302; 435/316; 126/351
[58] Field of Search ........................ 435/290, 316, 302; 126/351, 365; 122/159, 166 A, 169, 183, 421, 446

[56] References Cited

U.S. PATENT DOCUMENTS

| Re. 15,000 | 12/1920 | Stafford | 126/351 |
| 886,100 | 4/1908 | Walker | 126/351 |
| 1,141,247 | 6/1915 | Hudler | 122/169 |
| 1,704,807 | 3/1929 | O'Neal | 126/351 |
| 2,178,002 | 10/1939 | Simpson | 126/365 |
| 3,908,604 | 9/1975 | Vöcklinghaus | 122/421 |
| 4,819,587 | 4/1989 | Tsutsui et al. | 126/351 |

FOREIGN PATENT DOCUMENTS 3525455 7/1985 Fed. Rep. of Germany ...... 435/290

Primary Examiner—James C. Yeung
Attorney, Agent, or Firm—Oblon, Spivak, McClelland, Maier & Neustadt

[57] ABSTRACT

Disclosed is a device described for heating brewing mash, and a heat source and a heat exchanger that transfers heat with it and that has mash flowing through it are provided. The heat exchanger exhibits at least one evenly coiled tube that has a smooth surface on the inner side. The spelts contained in the brewing mash continuously repolish the inner surface of the tube so that the danger of deposits and overheating of brewing mash components is reduced.

11 Claims, 3 Drawing Sheets

DEVICE FOR HEATING BREWING MASH

BACKGROUND OF THE INVENTION

1. Field of the Invention

In beer production, which can be broken down into malting, wort preparation and fermentation, it is necessary in an intermediate process step to bring the mash, i.e., crushed malt mixed with brewing water, in a controlled way to a predetermined temperature and to keep it there for a certain period to decompose the remaining starch into sugar and dextrin. In doing so—as in the entire field of food chemistry processes—it is important to arrange the heating so that delicate substances are not influenced to the detriment of taste. But on the other hand, even with such processes, attention is to be paid to the aspect of economic efficiency, i.e., a so-called external heating system for brewing mash must be able to perform the heating process in a relatively short time.

2. Discussion of the Background

For this purpose, devices are already known in which a tube bundle heat exchanger is used as a heat exchanger. Such heat exchangers are in fact very efficient and a matching of the heat transfer output to the process in each case can very easily be performed over the surface of the tube bundle. But it has turned out that such known devices worked qualitatively at a high level only in a very narrow operating range near an optimal heat output and a mash flow rate matched to it. But the application diversity of known devices was greatly limited so that the invention is based on the object of providing a device for heating brewing mash, i.e., an external heating system for mash designed to provide, in a greatly expanded operating spectrum, i.e., in a broadened range of heat output and flow rate, on the one hand, an economical and, on the other hand as careful as possible a heating of the brewing mash.

SUMMARY OF THE INVENTION

This object is achieved by the features given in the characterizing part of claim 1.

According to the invention, the brewing mash is pumped through at least one evenly coiled, for example spiral, bent tube that is heated by a heating medium. Since in this way no flow cross section changes result in the flow path of the brewing mash, an uncontrolled formation of turbulence in the flow channel is counteracted so that no uncontrolled overheating of mash components can occur. The smooth inner surface according to the invention of the tube also precludes microturbulences in the wall area of the tube so that even with direct application of a flame to the tube, baking on of mash parts is precluded. Even with a high specific heat transfer between a heating medium and brewing mash, the danger of taste-changing reactions of the brewing mash is reduced to a minimum. In doing so it has turned out that the spelts contained in the brewing mash, when flowing through at least the one tube, continuously take care of repolishing the inner surface so that deposits on the inner side of the tube and the subsequent start of overheating the mash components can systematically be precluded. It is obvious that increasing the flow rate through the heat exchanger according to the invention changes nothing with respect to the effects explained above, so that the device according to the invention is equally suited for breweries with widely varying production volumes. It is even possible to work with only a single, suitably coiled tube, since by coiling the tube on the one hand the heat exchange distance is lengthened and, on the other hand, the heat transfer coefficient at the tube walls can be raised especially by intensive contact between the spelts and the tube walls. But because of the increased heat exchange distance, moreover, the further advantage results that even with the greatest heat output the temperature increase per unit path can be kept smaller than is the case with conventional devices, so that a qualitatively higher quality heating of the brewing mash can be achieved.

Advantageous further developments of the invention are the object of the subclaims.

With the further development according to claim 2, at least the one tube can very conveniently be placed in a heating chamber. Further, the flow through the tube receives a swirl that improves the heat transfer by which, additionally because of the thus increased rubbing effect of the spelts, the self-polishing effect is reinforced for the inner walls of the tube.

The heat exchanger tube can be in heat exchange contact with a heating medium in various ways. Since no cross section changes are necessary in the path of the brewing mash from a reservoir to the heat exchanger and from the latter on the return to the reservoir, no heat expansions of parts need be taken into consideration in the heat exchange path, as was the case in the prior art, opening the possibility of leading at least one coiled tube directly through a combustion chamber and acting with a heating flame there.

Of course it is also possible to lead at least one tube according to claim 4 through a separate heating chamber that is flushed by a suitable heating medium, such as for example a heating gas or a vapor stream.

With the further development according to claim 5, the formation of deposits on the inner wall of the tube is counteracted at the outset, by which the rubbing effect of the spelts can extend from the startup of the device to the entire inner surface area of the tube. The operating reliability of the device is additionally increased this way.

With the further development according to claim 7, the heat output can additionally be matched to the production system present in each case.

Of course the design according to the invention of the device is not set for any particular conveyance of the brewing mash flow relative to the flow of the heating medium. But it has proven advantageous to convey the brewing mash either countercurrent or cocurrent to the flow of the heating medium.

With the further development according to claim 10, there results a more even introduction of the heating warmth into the tube, by which the danger of localized overheating is additionally reduced.

Since, as already indicated above, the flow relationships inside the tube are qualitatively changed only slightly even with greatly varying flow rates, the device can advantageously be equipped according to claim 11 with a control device that continuously controls the flow rate of the brewing mash depending on the instantaneous temperature increase per time unit.

Other advantageous embodiments are the object of the remaining subclaims.

BRIEF DESCRIPTION OF THE DRAWINGS

Below, based on diagrammatic drawings, several embodiments of the invention are described in greater detail. There are shown in.

DESCRIPTION OF THE PREFERRED EMBODIMENTS

Figure 1:
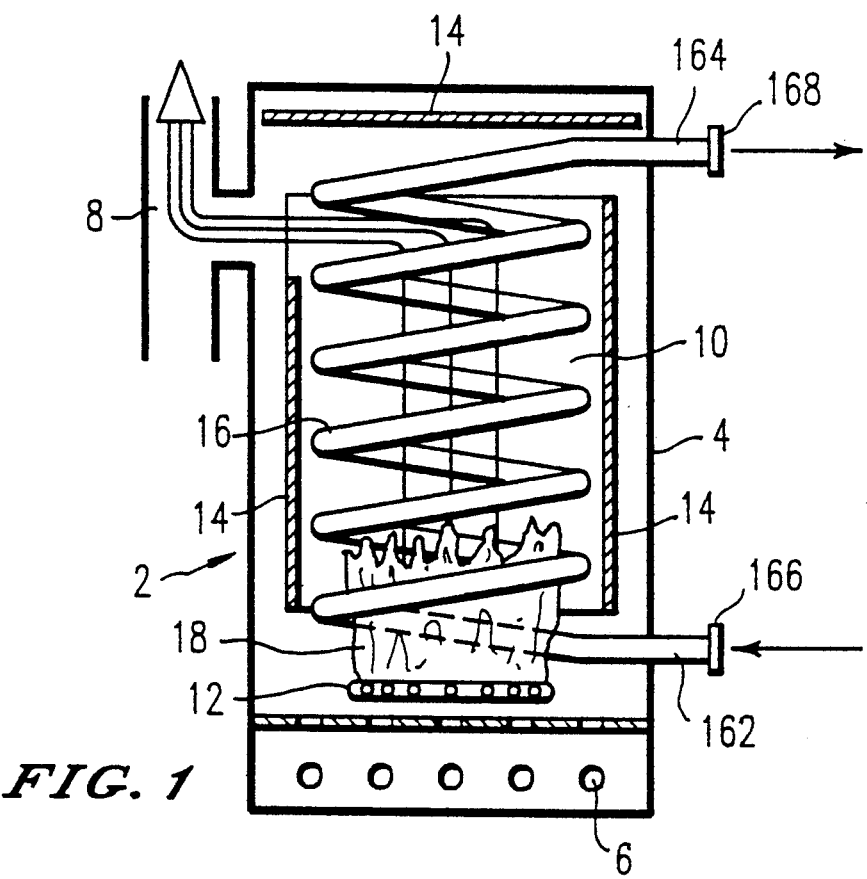
FIG. 1, a diagrammatic sectional view of a first embodiment of the device for heating brewing mash.

In FIG. 1, reference symbol 2 denotes an external heating system for brewing mash, i.e., a device with which the brewing mash can be brought to a certain process temperature according to a predetermined heating pattern. This heating device exhibits a housing 4, which, for example, has a cylindrical shape. Air inlet openings 6 are made on the bottom side of the housing and on the top side a hot air outlet tube 8 is provided. Housing 4 encloses a heating chamber 10 below which a burner 12, for example a gas or oil burner, is provided. The walls of housing 4 are protected by a shield 14 from excessive temperature effect.

Through heating chamber 10 there is led a tube coil in the form of a spirally coiled tube 16 that is led out of heating chamber 10 by straight sections 162, 164. In these areas there are connections 166 and 168 for suitable feeding or discharging.

Coiled tube 16 is made of a polished tube that is seamless on the inside and that consists preferably of stainless steel. The brewing mash to be treated, which is drawn out of an intermediate container by a pump not shown in more detail in FIG. 1, is pumped through tube 16 so that it is fed in through section 162 and removed through section 164. In flowing through the tube spiral, heat is fed to the brewing mash first by burner flames 18 and, with increasing path distance, by the heated hot air. The temperature difference of the brewing mash in sections 162 and 164 can be controlled or adjusted by the flow rate and the output of burner 12. It has turned out that the spelts contained in the brewing mash, even at reduced flow rates, cause a continuous self-polishing effect by which deposits on the inner side of the tube spiral and thus overheating of brewing mash components can be prevented. It can be seen from the drawing that no cross section changes occur in the flow path of the brewing mash so that the flow profile, even with drastic changes in the flow rate, remains constant, by which turbulences in the heating area and localized overheating caused by them are eliminated. In this way a very gentle and very easily controllable heating of the brewing mash to the desired temperature is made possible. Further, the lengthened heat transfer distance, even with the highest burner outputs, results in a reduced temperature gradient relative to the unit path, by which the danger of overheating can additionally be reduced.

Figure 2:
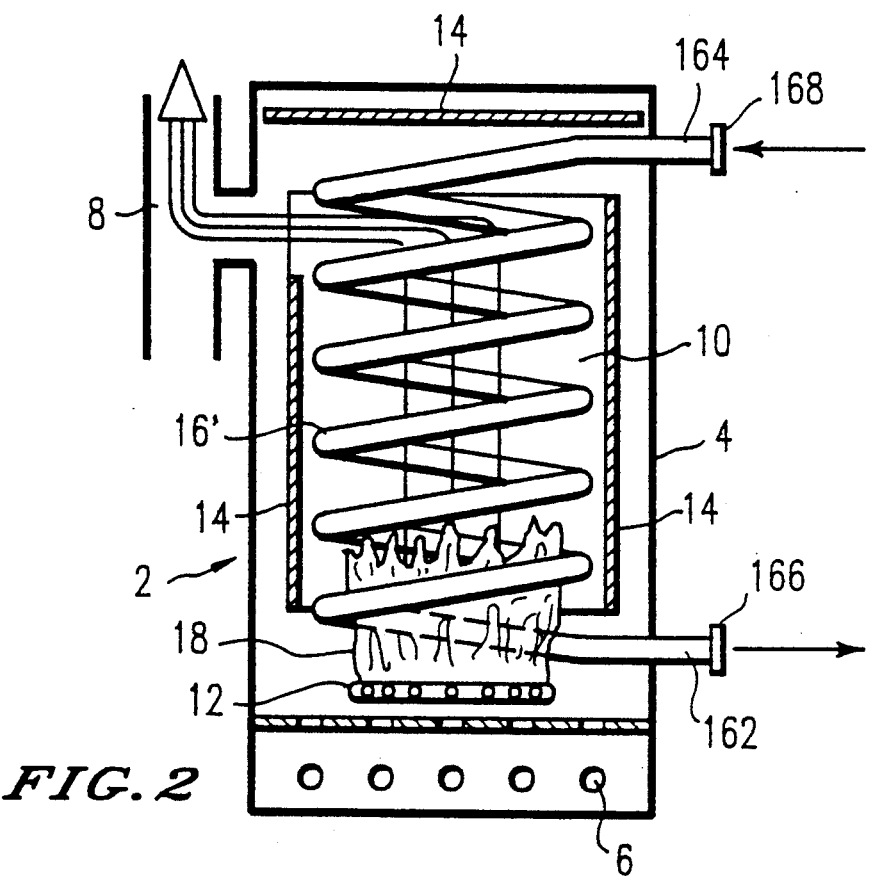
FIG. 2, a view similar to FIG. 1 of another embodiment of the device with reversed flow direction.

FIG. 2 shows the same device for heating brewing mash as in FIG. 1. For this reason the components of the device are designated with identical reference symbols. The only difference from the embodiment according to FIG. 1 is the flow direction of tube spiral 16, so that a countercurrent heat exchanger is provided.

Figure 3:
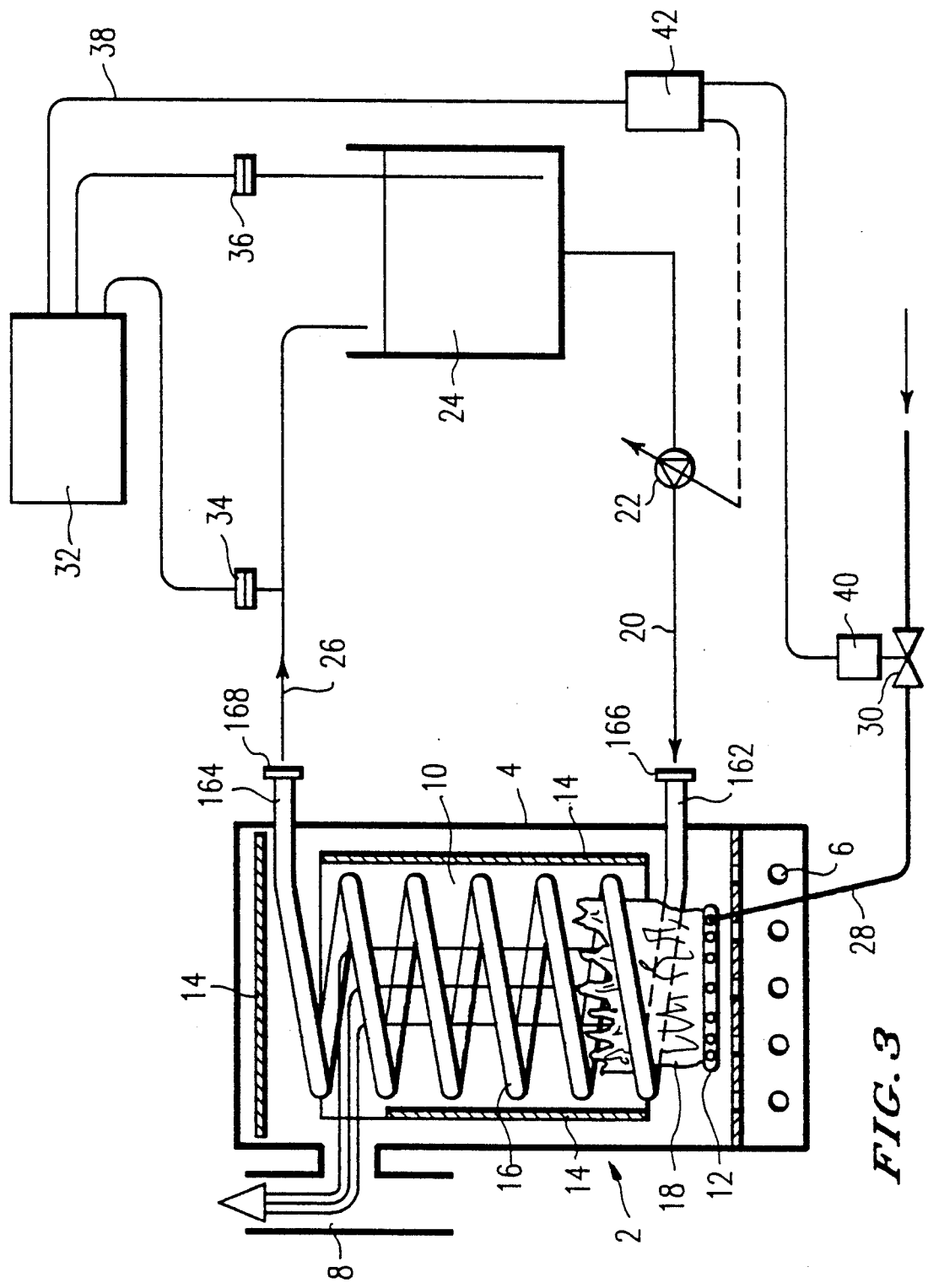
FIG. 3, a diagrammatic view of the device according to FIG. 1 with an assigned control device.

FIG. 3 shows a preferred control device for the device for heating brewing mash shown in FIG. 1. Since the device itself is designed identically to the one according to FIG. 1, a more detailed description of this device can be dispensed with. Again, identical reference symbols are used for comparable elements.

Brewing mash from an intermediate container 24 is fed to section 162 by a feeder pipe 20 with the aid of a preferably adjustable pump 22. The heated brewing mash is fed back from section 164 to intermediate container 24 by a return pipe 26.

Burner 12 has a heating agent feed pipe 28, in which a regulating valve 33 is incorporated.

Reference number 32 designates a central control unit to which are fed signals of a temperature measuring point 34 in return pipe 26 and of another temperature measuring point 36 for the temperature of the brewing mash in intermediate container 24. By a computer provided in central control unit 32, an appropriate control signal is given by a control line 38 to a control device of pump 22 and/or a control device 40 of regulating valve 30. For this purpose, there can be incorporated in the control line a suitable logic unit 42, with which the control of pump 22 or regulating valve 30 can additionally be influenced. This regulation principle is suitable for two- or three-stage gas or oil burners. But still more exact temperature profiles can be achieved if continuously adjustable burners are used. Preferably the computer provided in the control unit is in a position to detect also the heating rate of the brewing mash to preclude overheating of the brewing mash in good time.

Of course the invention is not limited to the concrete embodiments described above. Thus it is possible for example that instead of direct contact of burner flame 18 with tube spiral 16, a design is used in which the tube spiral is placed in a heating chamber flushed by hot air and/or hot vapor.

Figure 4:
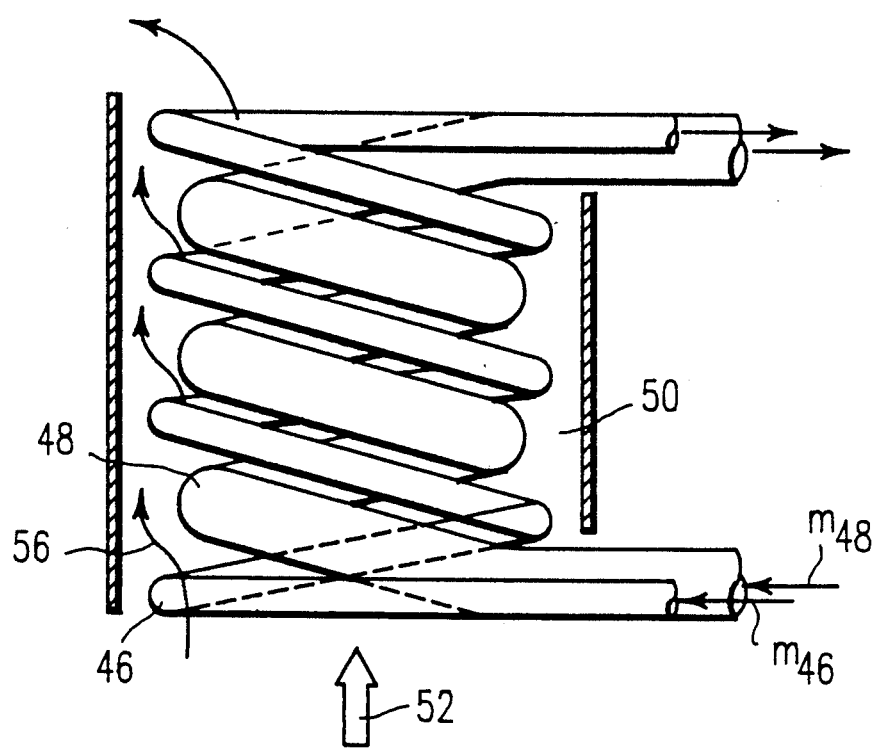
FIG. 4, another embodiment of the heat exchanger associated with the device.

Variations with respect to the number, position and size of the tubes conveying the brewing mash are also possible. One possible variant consists in that, according to FIG. 4, two tube spirals 46 and 48 are arranged inside a heating chamber 50, which again has a shield for the housing walls not shown in more detail. The flow of the heating medium is denoted by arrow 52. The arrows varying in size on the right side of FIG. 4 indicate the mass throughputs, varying in size, through both tube spirals 46 and 48. Arrows 56 are to indicate the division of the heat flow inside heating chamber 50, which assures an even heating on all sides of tube spirals 46 and 48.

Figure 5:
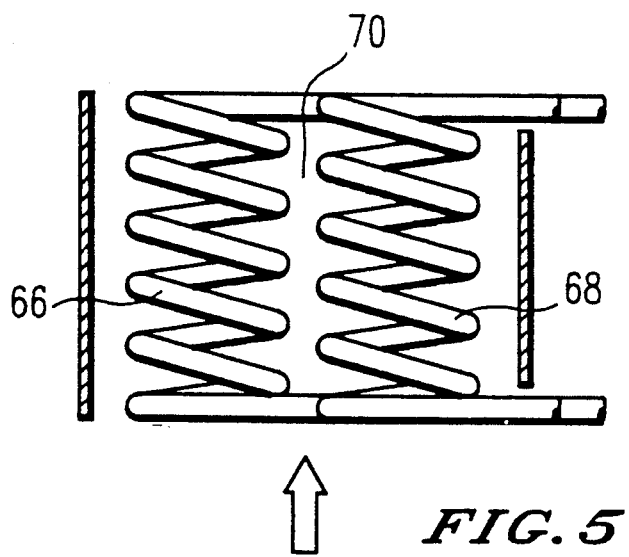
FIG. 5, another variant of the heat exchanger.

Another variant of the arrangement with several tube spirals is shown in FIG. 5. Here there are two tube spirals 66 and 68 next to each other in a common heating chamber 70. Also in this embodiment there occurs a branching of the heating medium stream into the different areas of heating chamber 70, so that an intensive and as even a heating as possible of tube spirals 66 and 68 occurs.

The invention is not limited either to the tube consisting of a tube polished on the inner side. Rather, suitable coatings can also be provided that can continuously be repolished by the effect of the spelts carried along in the brewing mash.

The invention thus provides a device for heating brewing mash and a heat source and a heat exchanger transferring heat with it and having mash flowing through it are provided. The heat exchanger exhibits at least an evenly coiled tube that has a smooth surface on the inner side. By the spelts contained in the brewing mash, the inner surface of the tube is continuously repolished, so that the danger of deposits and overheating of the brewing mash components is reduced.

What is claimed:

1. A device for heating brewing mash, which comprises:
   a heat source;
   a heat exchanger that is in direct heat exchange contact with said source wherein said heat exchanger has mash flowing through it and has at least one evenly coiled tube for flow of said brewing mash in a single spiral direction and wherein said coil tube has a smooth surface on an inner side thereof;
   a control device for controlling the flow rate of the brewing mash through said at least one tube depending upon temperature change per unit of time;
   an intermediate container; and
   a fuel feed line having a valve and a computing unit for controlling, depending on a temperature measurement of the temperature of brewing mash in said intermediate container and before entry into said intermediate container, said valve in said fuel feed line.

2. Device according to claim 1, wherein said at least one tube is coiled spirally.

3. Device according to claim 1 or 2, which comprises a combustion chamber wherein said at least one tube is led through said combustion chamber.

4. Device according to claim 1 or 2, which comprises a chamber fed with a heating medium wherein said at least one tube is led through said chamber.

5. Device according to claim 4, wherein the brewing mash is led through said at least the one tube in a direction countercurrent to the flow of the heating medium.

6. Device according to claim 4, wherein the brewing mash is led through said at least one tube cocurrently to the flow of the heating medium.

7. Device according to claim 2, which comprises a heat transfer chamber wherein said at least one tube comprises a plurality of tubes wherein several of said tubes are positioned adjacent each other and are led through said heat transfer chamber.

8. Device according to claim 7, wherein said at least one tube is positioned a constant distance from a wall over an entire height portion of said heat transfer chamber.

9. Device according to claim 1, wherein an inner surface of said at least the one tube comprises a polished surface which is seamless.

10. Device according to claim 1, wherein said at least one tube comprises a stainless steel tube.

11. Device according to claim 1, which comprises a pump positioned between said intermediate container and said heat exchanger and a computing unit for generating an output signal wherein said output signal controls said pump.

* * * * *